US005751484A

United States Patent [19]

Goodman et al.

[11] Patent Number: 5,751,484

[45] Date of Patent: May 12, 1998

[54] COATINGS ON GLASS

[75] Inventors: Ronald D. Goodman, Toledo; Michel J. Soubeyrand, Holland, both of Ohio; Timothy Jenkinson, Wigan, England

[73] Assignees: Libbey-Owens-Ford Co., Toeldo, Ohio; Pilkington PLC, England

[21] Appl. No.: 758,692

[22] Filed: Dec. 3, 1996

Related U.S. Application Data

[63] Continuation-in-part of Ser. No. 179,157, Jan. 10, 1994, Pat. No. 5,580,364, which is a continuation-in-part of Ser. No. 87,329, Jul. 8, 1993, Pat. No. 5,505,989.

[51] Int. Cl.[6] .............................. G02B 5/08; B32B 17/06

[52] U.S. Cl. .......................... 359/512; 359/507; 359/589; 428/216

[58] Field of Search ..................................... 359/507, 509, 359/512, 838, 870, 883, 884, 894, 580–590; 65/60.2, 60.5, 60.8, 95, 97; 427/165–167, 419.2, 419.3, 419.4, 255, 255.3

[56] References Cited

U.S. PATENT DOCUMENTS

| | | | |
|---|---|---|---|
| 4,634,242 | 1/1987 | Taguchi et al. | 359/512 |
| 5,217,753 | 6/1993 | Goodman et al. | 65/60.2 |
| 5,525,406 | 6/1996 | Goodman et al. | 359/589 |
| 5,576,885 | 11/1996 | Lowe et al. | 359/512 |

*Primary Examiner*—Thong Nguyen
*Attorney, Agent, or Firm*—Marshall & Melhorn

[57] ABSTRACT

A method of producing mirrors comprising depositing onto a ribbon of hot glass during the production process a coating comprising at least one pyrolytic reflecting layer and at least one color modifying layer whereby the mirrors exhibit color in reflectance and have a visible light reflection of at least 35% and less than 70%. There is also a provided a mirror having such a coating.

3 Claims, 1 Drawing Sheet

10

12

14

20

18

16

12

COATINGS ON GLASS

CROSS REFERENCE TO RELATED APPLICATIONS

This application is a continuation-in-part of U.S. application Ser. No. 08/179,157, filed Jan. 10, 1994, now U.S. Pat. No. 5,580,364, which in turn is a continuation-in-part of U.S. application Ser. No. 08/087,329, filed Jul. 8, 1993, now U.S. Pat. No. 5,505,989. This latter application shows the following foreign application priority data:

Jul. 11, 1992 [GB] United Kingdom . . . 9214766.9

Apr. 30, 1993 [GB] United Kingdom . . . 9309036.3

BACKGROUND OF THE INVENTION

The invention relates to a method of producing mirrors, and to coated glass substrates incorporating coatings exhibiting reflected color.

The light reflecting properties of mirrors are generally provided by a layer of highly reflecting metal, especially silver, aluminum or chromium, applied to a glass or plastics substrate; copper layers are sometimes used as an alternative, but are generally less acceptable because of the strong red tint of the reflected light.

Silver coatings are generally applied to preformed glass plates, in the cold, by wet chemical methods in which a solution of silver salt is applied to the glass surface and reacted with a reducing agent which reduces silver ions present to silver metal which deposits on the glass surface. The silver used is not very durable in use and in practice requires protection by other layers, and these methods are generally unsuitable for application to glass on the production line on which it is formed so that a separate "silvering" line is required to produce the silvered glass.

Aluminum coatings are difficult to apply by chemical methods because of the strongly reducing nature of aluminum metal, and aluminum mirrors are generally produced by deposition methods carried out at low pressure, e.g., by sputtering. Such low pressure methods are essentially batch processes and, like the wet chemical methods used for deposition of silver mirrors, are generally unsuitable for on-line application on the production line on which the glass is made.

Silicon layers have also been used to produce reflecting layers (which, like silver and aluminum layers, are substantially neutral in reflection color) on architectural glazing for aesthetic and solar control purposes. U.S. Pat. Nos. 4,088,471, 4,188,444 and 4,469,045 relate to a continuous chemical vapor deposition method for producing float glass having such a silicon layer, and U.S. Pat. No. 4,661,381 describes a development of that method.

SUMMARY OF THE INVENTION

The present inventors have discovered that coatings can in practice be applied on-line to glass during the production process, especially on a float glass production line, to produce mirrors particularly adapted for automotive use and even more beneficially for outside automotive mirrors, i.e., side view mirrors, having a visible light refection in the range of at least 35% to less than 70% and a reflected color. Preferably, the mirrors will have a visible light reflection between 35% and 55%. The reflected color, which results from a unique combination of layer compositions and thicknesses, will generally be such that, when defined by reference to the CIELAB color scale system, $a^{*2}+b^{*2}$ is greater than 50 and preferably greater than 100 [Illuminant A]. Reflection colors in the blue-green sector (that is, a* and b* both negative) are preferred, and in one product the reflected color has the following values: a* between −15 and −25 and b* between −15 and −30 (Illuminant A).

According to the present invention mirrors having a colored visible light reflection of less than 70% are provided by depositing onto a ribbon of hot glass during the float glass production process a coating comprising at least one pyrolytic layer and at least one color modifying layer. The coated ribbon is cut on-line, and will usually be further cut and bent off line to provide separate mirrors of the required size and shape.

The pyrolytic layer is a light reflecting layer and is, in use, furthest from the source of light to be reflected, and the color modifying layer or layers are between the light source and the reflecting layer. Thus, for front surface mirrors the inner of the said layers is the reflecting layer and intermediate and outer layers act as color modifying layers, with the outer layer also taking on a protective layer status or function. The inner layer is identified as the layer of the coating nearest to the glass and the outer layer as the layer furthest from the glass of all the layers. In some instances, it is desired that mirrors intended for exterior use on an automobile be provided with an electrical resistance heater for defrosting or defogging the mirror when weather conditions require. This is easily accomplished in accordance with the invention by utilizing as the outer layer of the mirror coating a layer of doped tin oxide which functions as a resistance element. It is only necessary that suitable leads, e.g., bus bars, be applied in electrical contact with the coating.

BRIEF DESCRIPTION OF THE DRAWINGS

The invention is illustrated but not limited by the following drawing and Examples. In the drawing.

DETAILED DESCRIPTION OF THE PREFERRED EMBODIMENT

Figure 1:
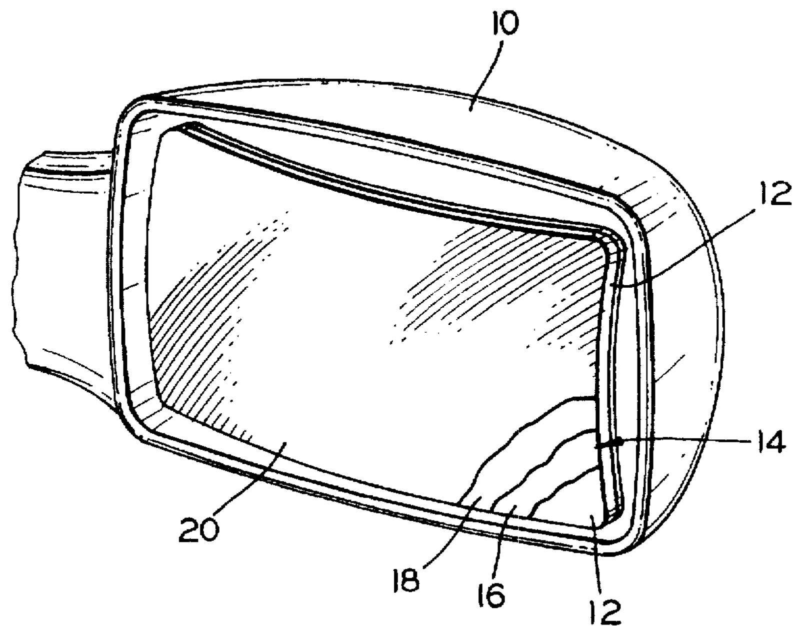
FIG. 1 is a perspective view, with parts broken away, of a mirror in accordance with the invention in use as a front surface outside automotive mirror.

It is known in the art that refractive index varies with wavelength. In this specification and claims, references to "refractive index" are intended to mean (in conventional manner) the refractive index for light of wavelength 550 nm and, in assessing and quoting refractive index values, any imaginary part of the refractive index is disregarded.

The expression "visible light reflection", as used in the present specification and claims, refers to the percentage of light reflected under Illuminant D65 source 1931 Observer Conditions.

The reflecting layer should have a relatively high refractive index and the color modifying layer or layers should be of lower refractive index. The precise refractive indices required will depend on the light reflection to be achieved, and for a visible light reflection of around 35%, the reflecting layer should have a refractive index of above 2, preferably at least 2.5. For higher light reflections, high refractive indices will be desirable so that, for a visible light reflection of 60%, a material of refractive index of at least 2.8 will generally be used for the reflecting layer. The color modifying layer or layers will usually have a refractive index less than 2.

Silicon is preferably used for the pyrolytic reflecting layer because (a) it is readily deposited on-line on hot glass, for example, by the processes described in U.S. Pat. Nos. 4,088,471, 4,188,444 and 4,469,045, and (b) provides a visible light reflection in the range of at least 35% to less than 70% in readily obtainable thicknesses of 100Å to 500Å.

The refractive index of silicon may be as great as about 5, (see P. J. Martin, R. P. Netherfield, W. G. Sainty and D. R. McKenzie in Thin Solid Films 100 (1983) at pages 141–147) although lower values are often encountered.

It is believed that, in practice, the value varies depending on the precise physical form of the silicon and the presence of any impurities, for example oxygen, nitrogen or carbon. For the purpose of the present invention, the presence of such impurities may be tolerated (and indeed, it is difficult in practice to produce on-line silicon coatings without significant oxygen and/or carbon incorporation) provided the refractive index is not reduced below about 2.8. Thus the term "silicon" as used herein refers to material which is predominantly silicon, but may contain minor proportions of impurities, provided its refractive index is at least 2.8.

While its high refractive index and ease of deposition favor the use of silicon, other materials may be employed as the reflecting layer.

It is preferred to use as an intermediate color modifying layer a material which can be pyrolytically deposited and has a refractive index less than 2. A suitable and convenient layer material is silicon oxide, which may however contain trace amounts of elements such as carbon or nitrogen, and the term "silicon oxide" is used herein to encompass silicon oxides containing these trace elements having a refractive index of less than 2. Surprisingly, it is found in practice, that adjacent layers of silicon and silicon oxide can be applied pyrolytically to the glass without interdiffusion or interactions which would cause unacceptable reduction in the refractive index of the silicon or increase in the refractive index of the silicon oxide; the adjacent layers of silicon and silicon oxide appear to remain, at least in terms of their optical performance, separate and distinct. However, it may be that at the interfaces of the layers there exist physically narrow interaction zones with steep refractive index gradients that do not alter the optical characteristics of the mirror.

In order to achieve the desired reflection and color properties, the intermediate color modifying layer should have a thickness in the range of 100Å to 700Å.

Another material which may be used for the intermediate layer is aluminum oxide.

The outer layer of the mirror coating of the invention influences the reflected color and provides a protective layer for the reflecting and color modifying layers. Suitably, the outer layer may be tin oxide, titanium oxide, or mixtures thereof in a thickness range of 500Å to 1000Å. This layer, similarly to the intermediate color modifying layer(s) will normally have a refractive index of no more than 2, although titanium oxide may have a refractive index of up to 2.4. In accordance with one embodiment, the layer is undoped tin oxide in a thickness between 750Å and 1000Å and has a refractive index of approximately 1.9.

In a method for producing mirrors in accordance with the invention, the layers of the required index and thickness are applied to a ribbon of hot glass during the glass production process. The depositions may be carried out in a known manner by liquid or powder spray processes, or by a chemical vapor deposition process, and each of the layers may be deposited by a different type of process. The depositions may be pyrolytic involving decomposition of a compound which is a precursor for the material of the desired layer, possibly by reaction with another compound.

In general, it is convenient to use a chemical vapor deposition process to apply any silicon or silicon oxide (which may contain carbon) layers that may be required. Thus, for example, any silicon layer may be deposited (directly or indirectly) on the hot substrate by chemical vapor deposition from a silane gas, conveniently in an inert gaseous diluent or carrier gas, for example nitrogen and/or helium. It is generally most convenient to use monosilane, although other silanes may also be used, such as dichlorosilane. One suitable process for deposition of such a silicon layer is described in U.S. Pat. No. 4,188,444. If desired, for example to improve the akali resistance of the silicon coating, the reactant gas may contain a proportion of a gaseous electron donating compound, especially an ethylenically unsaturated hydrocarbon compound, for example, ethylene, as an additive.

A silicon oxide layer for use as the color modifying layer of low refractive index (i.e., an intermediate layer) may similarly be deposited by chemical vapor deposition from a silane gas, conveniently in a gaseous inert diluent or carrier gas, in admixture with oxygen or a source of oxygen. It is preferred to use a mixture of a silane and an ethylenically unsaturated hydrocarbon, e.g., ethylene, together with oxygen gas. The relative concentrations of silane and the source of oxygen used will depend on the refractive index required; in general, the lower the refractive index required, the larger the proportion of oxygen-containing compound to silane to be used. Again, the silane used is preferably a monosilane.

For a metal oxide outer layer, such as tin oxide or titanium oxide, either a liquid or powder spray process or a chemical vapor deposition procedure will generally be used. Thus, for example, a layer of tin oxide or titanium oxide may be deposited by chemical vapor deposition by reaction of the corresponding gaseous metal chloride and water vapor, or by spraying a non-aqueous solution of the metal chloride onto the hot glass in the presence of water vapor. Thus, tin oxide may be deposited by chemical vapor deposition of components selected from tin tetrachloride and water vapor, and an organo tin compound such as diethyl tin dichloride or tetramethyl tin, and oxygen, the oxygen optionally being present in air. The titanium oxide may be deposited by chemical vapor deposition of a titanium alkoxide, such as titanium isopropoxide, optionally in the presence of water or air. Undoped tin oxide is deposited by chemical vapor deposition from a gaseous precursor mixture composed of an organometallic compound such as dimethyl tin dichloride, water vapor, oxygen and helium.

When applying a coating layer to a ribbon of float glass, the chemical vapor deposition techniques can conveniently be carried out inside the float bath, i.e., where the glass is supported on a molten metal bath under a protective atmosphere (but preferably after the glass has finished stretching, i.e., at a glass temperature below 750° C.), or after the ribbon has emerged from the float bath. When using a gas containing monosilane to deposit silicon or silicon oxide layers, it is preferred to carry out the deposition of that layer in the float bath where the glass is at a temperature in the range of 600° C. to 750° C. in order to achieve a satisfactory rate of deposition.

When applying a coating layer to a ribbon of float glass by a liquid or powder spray process, it will generally be more convenient to deposit the layer after the ribbon of glass has emerged from the float bath.

As previously noted, the process of the present invention is useful for the production of automotive mirrors, particularly outside side view mirrors. The mirrors may be provided with an obscuring layer, preferably a substantially opaque layer, on the side which is to be remote from the source of light to be reflected in use. Thus, for front surface mirrors the obscuring layer will generally be applied over the uncoated back surface of the glass.

It has been proposed that a mirror intended for exterior use on an automobile be provided with an electrical resistance heater for defrosting or defogging the mirror when weather conditions require. Typically, however, such mirror arrangements have been expensive, have been bulky, or have been unreliable in use. The mirror of the present invention has surprisingly been found to be adapted for electrical heating through use of the tin oxide coating as a resistance element. It is only necessary that suitable leads, e.g., bus bars, be applied in electrical contact with the coating as is well known, for example, in the construction of electrically heated windshields for automobiles. If electrical heating is contemplated, it is preferred that the tin oxide coating be doped, e.g., with a reactive fluorine component, as is well known in the art. In this respect, a ratio of one (1) mol percent HF to $SnO_2$ is suitable and capable of providing a resistance on the order of 15 to 20 ohms per square.

For use in the electrical heated mirror embodiment of the invention, the thickness of the doped tin oxide should be in the range of 1800Å to 2800Å, and the silicon oxide intermediate layer should be in the range of 300Å to 700Å. The thickness of the silicon reflecting layer should be in the range of 100Å to 500Å. The reflected color of the electrically heated mirrors as defined by the CIELAB color scale system will be in the range a* between 0 and −10 and b* between −5 and −20.

The ability to produce glass mirrors on-line at high yield, using coating steps based on known technology, for example the pyrolytic deposition of a silicon layer, is an important step forward and many important mirror products which may be produced in this way are novel.

Referring to FIG. 1, a front surface glass outside automotive mirror is shown assembled in a suitable casing 10 and comprises a float glass substrate 12 carrying a coating 14 comprising an inner layer 16 of relatively high refractive index, for example of pyrolytic silicon having a refractive index of at least 2.8, an intermediate layer 18 of relatively low refractive index, for example of silicon oxide having a refractive index below 2, and an outer layer 20 of, for example of pyrolytic tin oxide.

All of the layers are applied by chemical vapor deposition. The reflective layer 16 has a thickness in the range of 100Å to 500Å, the color modifying layer 18 a thickness in the range of 300Å to 700Å, and the outer protective layer 20 a thickness in the range of 1800Å to 2800Å.

Figure 2:
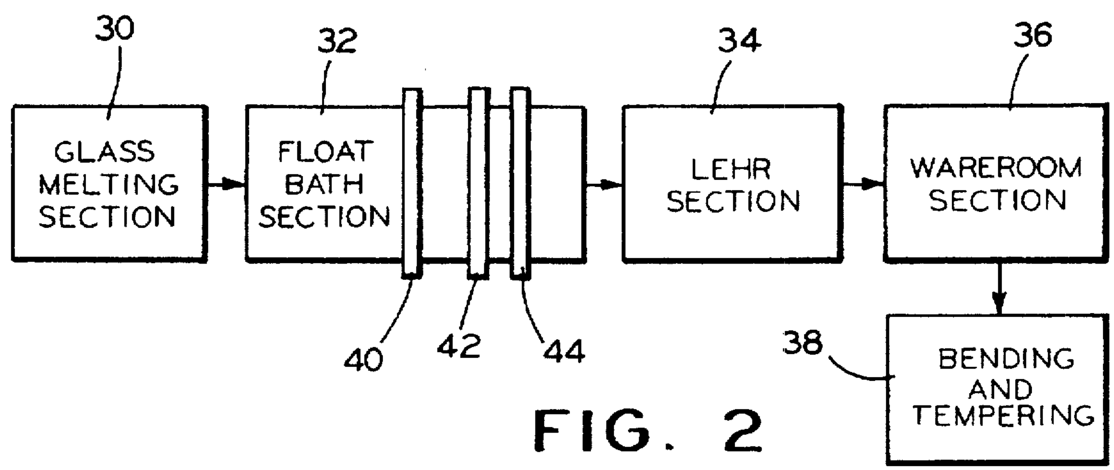
FIG. 2 is a diagrammatic representation of the arrangement of coating stations on a float glass production line for production of mirrors in accordance with the present invention.

FIG. 2 illustrates diagrammatically, a float glass production line comprising a glass melting section 30, a float bath section 32 for forming the molten glass into a continuous ribbon, a lehr section 34 for annealing the glass ribbon, a wareroom section 36 for cutting pieces of glass from the ribbon for storage and/or distribution and use, and a bending and tempering station 38. For the production of mirrors in accordance with the invention, each of the three coating stations for respectively applying the inner, intermediate and outer layers will normally be located in or between the float bath section 32 and lehr section 34; in the illustrated embodiment of the invention, the three coating stations 40, 42, 44 are arranged in the float bath section 32 as shown in FIG. 2. However, in alternative embodiments, one or each of the coating stations for applying inner, intermediate and outer layers in accordance with the invention may be located between the float bath section 32 and the lehr section 34. The location of each coating station is selected to be at a position where the glass ribbon has substantially reached its final thickness (usually at a glass temperature of around 750° C.) so that it is not subject to further stretching which might crack any coating applied, but where its temperature remains sufficiently high for formation of a further pyrolytic layer (usually a glass temperature of at least 300° C.).

Figure 3:
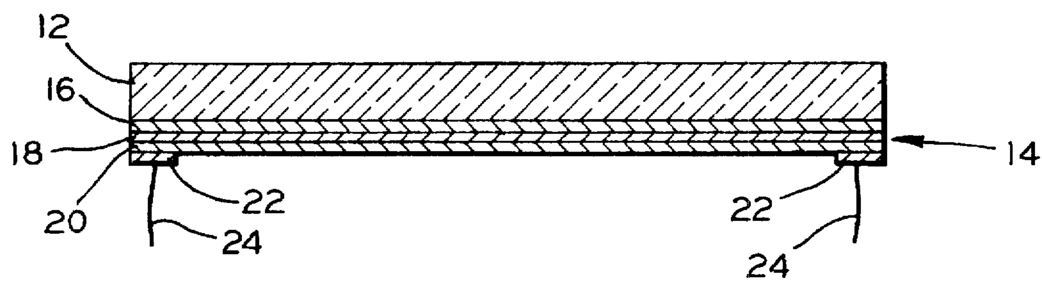
FIG. 3 is a sectional view of an electrical heated mirror in accordance with the invention.

FIG. 3 illustrates an electrically heated mirror in accordance with the invention. In this embodiment, electrodes or bus bars 22 are attached to two opposed edges of the outer tin oxide layer 20 of the mirror coating 14. The bus bars may be composed of a silver frit as is well known in the art, and through leads 24 are in electrical contact with a suitable power source, e.g., an automotive generator. The tin oxide layer, preferably doped with a reactive fluorine component, functions as an electrical resistance element and with the passage of electrical current through it, heats the mirror to a suitable defogging or deicing temperature.

The following Examples illustrate the present invention without limiting it, and in the Examples mirrors were produced on-line using a float glass production line having the structure shown in FIG. 2.

EXAMPLES

Glass mirrors, intended for use as front surface mirrors, were produced using the laminar vapor coating process and apparatus described in U.S. Pat. No. 4,504,526. Three separate coating beams, each as described in this patent, were used to apply successive silicon, silicon oxide and tin oxide layers (Examples 1, 3 and 4) and silicon, silicon oxide and silicon layers (Example 2) to a ribbon of float glass having a thickness and advancing at a lehr speed shown in Table 1. Each of the three coating beams was located in the float bath where the glass ribbon was supported on a batch of molten metal. The upstream, intermediate and downstream (each with reference to the direction of glass advance) beams were each respectively located at positions where the glass temperature was approximately as specified in Table 1.

The beams had a coating chamber with a length of approximately 40 cm in the direction of glass advance.

The upstream, intermediate and downstream beams were each fed with the respective gas mixtures specified in Table 1. Nitrogen ($N_2$) and helium (He) were used as carrier gases. In these Examples, the gas flows were all measured at ambient temperature and pressure 1 bar, except for flows of dimethyl tin dichloride (DMT) and water which are measured as a liquid, and all are quoted per meter width of glass coated.

No modification of the lehr conditions was required to anneal the resulting coated ribbon which had a reflecting appearance, the reflection being blue in color. The color can be quantified by the use of the CIELAB color coordinate system which is well known to the person skilled in the art. Examination of sample mirrors cut from the ribbon showed them to have a visible light reflection and color coordinates as specified in Table 2. In the Examples, the reflection and the color coordinates were measured using Illuminant D65 source 1931 Observer conditions. The measurements were on the coated side of the glass.

The thickness and refractive index of the individual layers of the coating were estimated from the reflection spectra of the individual layers deposited separately and the estimated values are specified in Table 2.

Several of the samples were bent to large radii of curvature on the order of 40 to 60 inches. These curvatures are those which would normally be found in outside automotive mirrors. No deterioration in physical appearance or reflective properties was observed.

TABLE 1

| | Glass Thickness mm | Glass Speed m/hour | Upstream Beam | | Intermediate Beam | | Downstream Beam | |
|---|---|---|---|---|---|---|---|---|
| | | | Temp. °C. | Gas Flows liters/min | Temp. °C. | Gas Flows liters/min | Temp. °C. | Gas Flows liters/min |
| Example 1 | 2.3 | 820 | 710 | $SiH_4$:2.9 $N_2$:26 He:115 | 680 | $SiH_4$:1.7 $C_2H_4$:17 $O_2$:3.6 $N_2$:63 He:57 | 600 | DMT:10.3 lbs/hr $H_2O$:13.2 lbs/hr $O_2$:200 He:300 |
| Example 2 | 1.2 | 320 | 680 | $SiH_4$:0.3 $N_2$:40 | 630 | $SiH_4$:2.8 $C_2H_4$:0.4 $N_2$:25 *$CH_3COCH_3$:9.4 | 620 | $SiH_4$:1.1 $C_2H_4$:0.2 $N_2$:20 |
| Example 3 | 2.3 | 820 | 710 | $SiH_4$:4.6 $N_2$:26 He:115 | 680 | $SiH_4$:1.1 $C_2H_4$:17 $O_2$:3.6 $N_2$:63 He:57 | 600 | DMT:10.3 lbs/hr $H_2O$:13.2 lbs/hr $O_2$:200 He:300 |
| Example 4 | 3.2 | 820 | 710 | $SiH_4$:10 $N_2$:450 | 680 | $SiH_4$:6.5 $C_2H_4$:38 $O_2$:25 $N_2$:530 | 600 | DMT:35 lbs/hr $H_2O$:20 lbs/hr $N_2$:120 $O_2$:240 HF:5 |

*mls/min

TABLE 2

| | Reflection | a* | b* | Inner Layer | | Intermediate Layer | | Outer Layer | |
|---|---|---|---|---|---|---|---|---|---|
| | | | | Thickness nm | Ref Index | Thickness nm | Ref Index | Thickness nm | Ref Index |
| Example 1 | 47% | −24.2 | −21.3 | 20 | 4.8 | 30 | 1.45 | 80 | 1.90 |
| Example 2 | 47% | −21.5 | −16.8 | N/A | 4.8 | N/A | 1.46 | N/A | 4.6 |
| Example 3 | 48% | −17 | −15 | 27 | 4.8 | 21 | 1.45 | 80 | 1.90 |
| Example 4 | 38% | −3.7 | −13.7 | 40 | 4.8 | 41.5 | 1.45 | 200 | 1.80 |

What is claimed is:

1. An automotive mirror comprising a float glass substrate carrying a coating including a first layer consisting essentially of silicon having a refractive index of at least 2.8 and a thickness in the range of 100Å to 500Å, a second layer consisting essentially of an oxide of silicon having a refractive index less than 2 and a thickness in the range of 300Å to 700Å, and a third layer of tin oxide including a reactive fluorine dopant and having a refractive index greater than the refractive index of the silicon oxide layer, said tin oxide layer being electrically conductive and having a thickness in the range of 1800Å to 2800Å, said mirror having a visible light reflectance between 35% and 55% and a reflected color defined by the CIELAB color scale system of a* between 0 and −10 and b* between −5 and −20.

2. An automotive mirror as defined in claim 1, wherein said fluorine doped tin oxide layer has a refractive index of approximately 1.8.

3. An automotive mirror as defined in claim 1, wherein bus bars are in electrical contact with said tin oxide coating to enable current flow therethrough and resistance heating thereof.

* * * * *